United States Patent [19]
Gahan

[11] Patent Number: 4,483,503
[45] Date of Patent: Nov. 20, 1984

[54] SWIVEL MOUNTINGS

[75] Inventor: Geoffrey D. Gahan, Great Missenden, England

[73] Assignee: Mouldmaking Design Centre Limited, Buckinghamshire, England

[21] Appl. No.: 364,095

[22] Filed: Mar. 31, 1982

[30] Foreign Application Priority Data

Apr. 3, 1981 [GB] United Kingdom ............... 8110579
Aug. 25, 1981 [GB] United Kingdom ............... 8125952

[51] Int. Cl.³ .......................................... A47B 91/00
[52] U.S. Cl. ................................... 248/349; 248/181
[58] Field of Search ............ 248/349, 346, 664, 665, 248/666, 673, 514, 521, 648, 299, 139, 133, 181, 183, 516, 661, 663; 403/130, 140

[56] References Cited

U.S. PATENT DOCUMENTS

| 2,594,404 | 4/1952 | Debrie | 248/664 |
|---|---|---|---|
| 2,739,780 | 3/1956 | Richards | 248/324 |
| 2,809,874 | 10/1957 | Johnson | 248/664 |
| 3,017,209 | 1/1962 | Thomas | 403/130 |
| 3,298,644 | 1/1967 | Sherburne | 248/55 |
| 3,390,854 | 7/1968 | Sherburne | 248/55 |
| 3,479,632 | 11/1969 | Galles | 248/349 |
| 3,545,387 | 12/1970 | Giambalvo | 248/412 |
| 3,604,923 | 9/1971 | Moffatt | 248/324 |
| 3,614,040 | 10/1971 | Martinez | 248/664 |
| 3,615,068 | 10/1971 | Edelstein | 248/349 |
| 3,908,942 | 9/1975 | Keith et al. | 248/346 |
| 3,974,994 | 8/1976 | Petterson | 248/663 |
| 4,354,654 | 10/1982 | Werner et al. | 248/663 |

FOREIGN PATENT DOCUMENTS

| 315425 | 9/1930 | United Kingdom . |
| 1353555 | 5/1974 | United Kingdom . |
| 1532591 | 11/1978 | United Kingdom . |
| 2115479 | 9/1983 | United Kingdom . |

Primary Examiner—William H. Schultz
Assistant Examiner—Ramon O. Ramirez
Attorney, Agent, or Firm—Beveridge, DeGrandi and Kline

[57] ABSTRACT

A swivel mounting for an instrument or apparatus, e.g. a visual display unit monitor, comprises two interconnected parts, one part, in use, being associated with an instrument or apparatus, and the other part being intended to remain stationary relative to a fixed surface, if necessary by fixing. The two parts have mating spherical surfaces which are capable of relative sliding movement to enable the instrument or apparatus and the one part to be rotated selectively about a vertical axis and a horizontal axis, relative to the other part.

11 Claims, 14 Drawing Figures

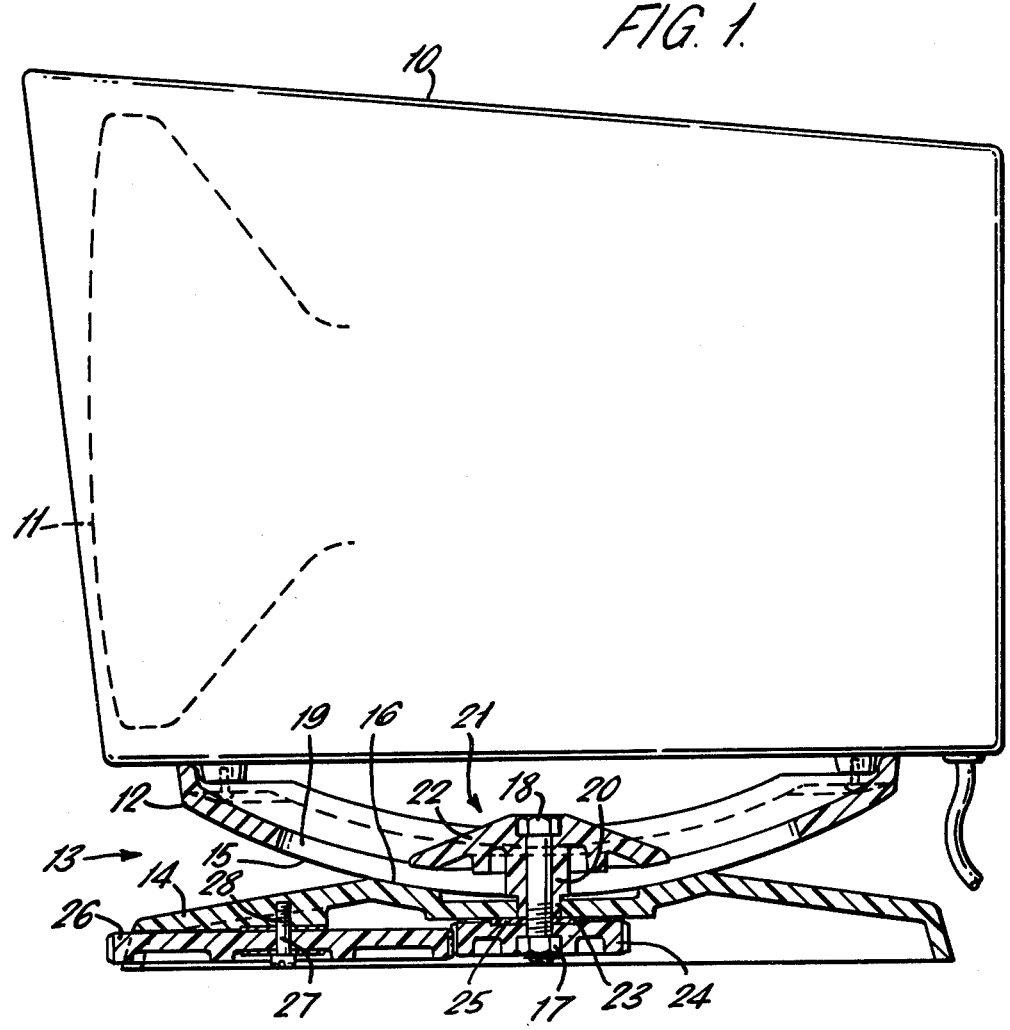
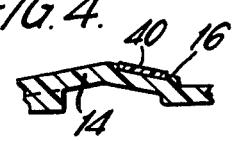
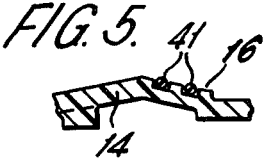
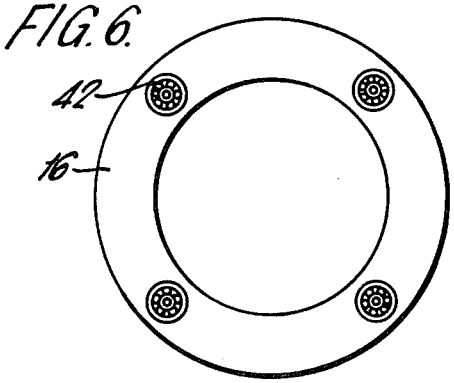

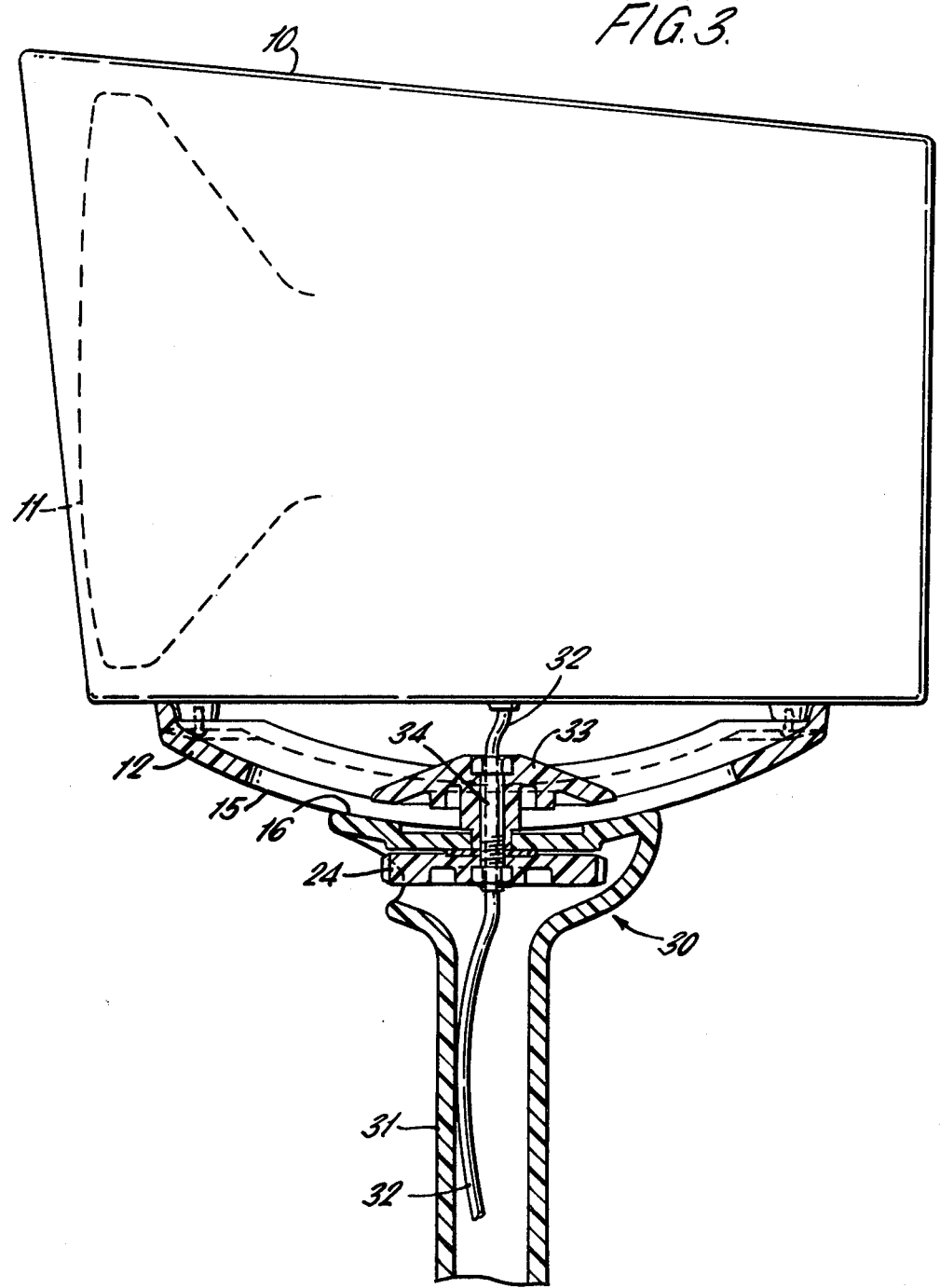

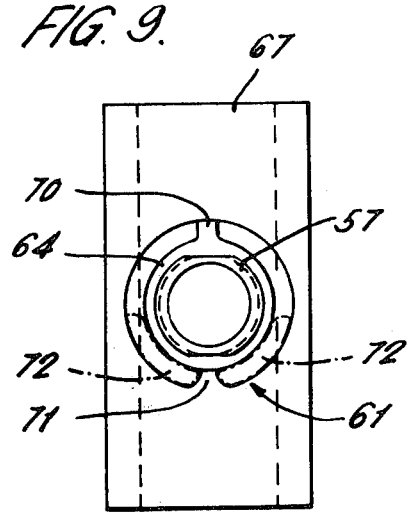
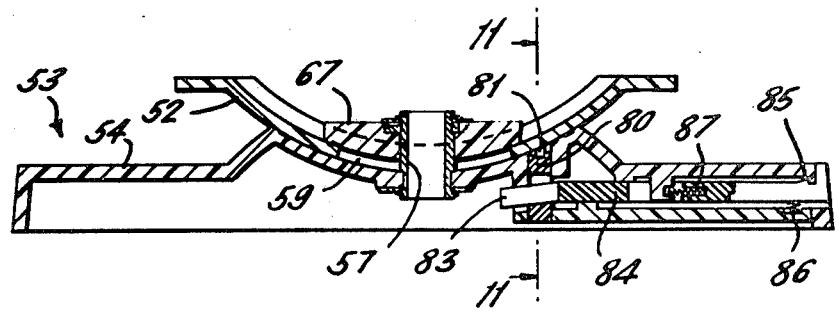
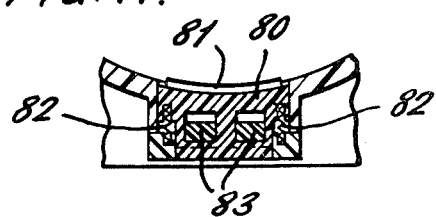

SWIVEL MOUNTINGS

BACKGROUND OF THE INVENTION

1. Field of the Invention

This invention relates to swivel mountings. More particularly but not exclusively, the invention relates to a swivel mounting for an instrument or apparatus which is normally stationary but whose optimum angle relative to a fixed base may be required to be changed from time to time. Such instruments or apparatus may be, for example, visual display unit monitors, television sets, radios, and speakers.

2. Prior Art

It is known to mount television sets in a yoke to allow the angle of viewing to be changed. It is also known to mount television sets and radios so that they may be rotated about a vertical axis. A visual display unit monitor is normally mounted in a static position.

SUMMARY

According to the invention there is provided a swivel mounting for an instrument or apparatus comprising two interconnected parts, one part, in use, being associated with an instrument or apparatus, and the other part being intended to remain stationary relative to a fixed surface, if necessary by fixing, the two parts having mating spherical surfaces which are capable of relative sliding movement to enable the instrument or apparatus and said one part to be rotated selectively about a vertical axis and a horizontal axis, relative to said other part.

Preferably the mounting includes guide means between the two parts which restrict the relative sliding movement between the spherical surfaces so that the instrument or apparatus and said one part can be rotated about only one horizontal axis.

In one embodiment of the invention the two parts are interconnected by a clamping device which may be tightened to lock the spherical surfaces against relative sliding movement.

In another embodiment of the invention the mounting has means interconnecting the two parts, and separate clamping means for applying or increasing frictional pressure between the parts to lock the spherical surfaces against relative sliding movement. The clamping means may have a wedge action, for example effected by a lever guided for longitudinal movement and actuated by the rotary action of a control knob.

Stop means may be provided between the two parts which limit the relative movement of the spherical surfaces about a vertical axis.

There may also be provided friction reducing means between the spherical surfaces to assist the relative sliding movement.

The means interconnecting the two parts may include an axial passageway for a power cable for the instrument or apparatus.

In one embodiment of the invention the swivel mounting is intended to stand an instrument or apparatus on a horizontal surface, e.g. a desk.

The invention also provides an instrument or apparatus, particularly but not exclusively a visual display unit monitor, incorporating or in combination with a swivel mounting as defined above.

BRIEF DESCRIPTION OF THE DRAWINGS

FIG. 1 is a side elevation of a visual display unit monitor attached to a swivel mounting, the mounting being shown in section along line 1—1 in FIG. 2;

FIG. 3 is a vertical section of another swivel mounting;

FIGS. 4 to 6 show three different friction reducing means which may be used to assist the relative sliding movement between the spherical surfaces of either swivel mounting of FIGS. 1 to 3;

FIG. 9 is a detail view showing stop means for limiting the extent of movement of the mounting of FIG. 7 about a vertical axis;

FIG. 10 is a similar sectional view to FIG. 7 of another swivel mounting having a different clamping arrangement;

FIG. 11 is a section along line 11—11 in FIG. 10;

DESCRIPTION OF THE PREFERRED EMBODIMENTS

Figure 2:
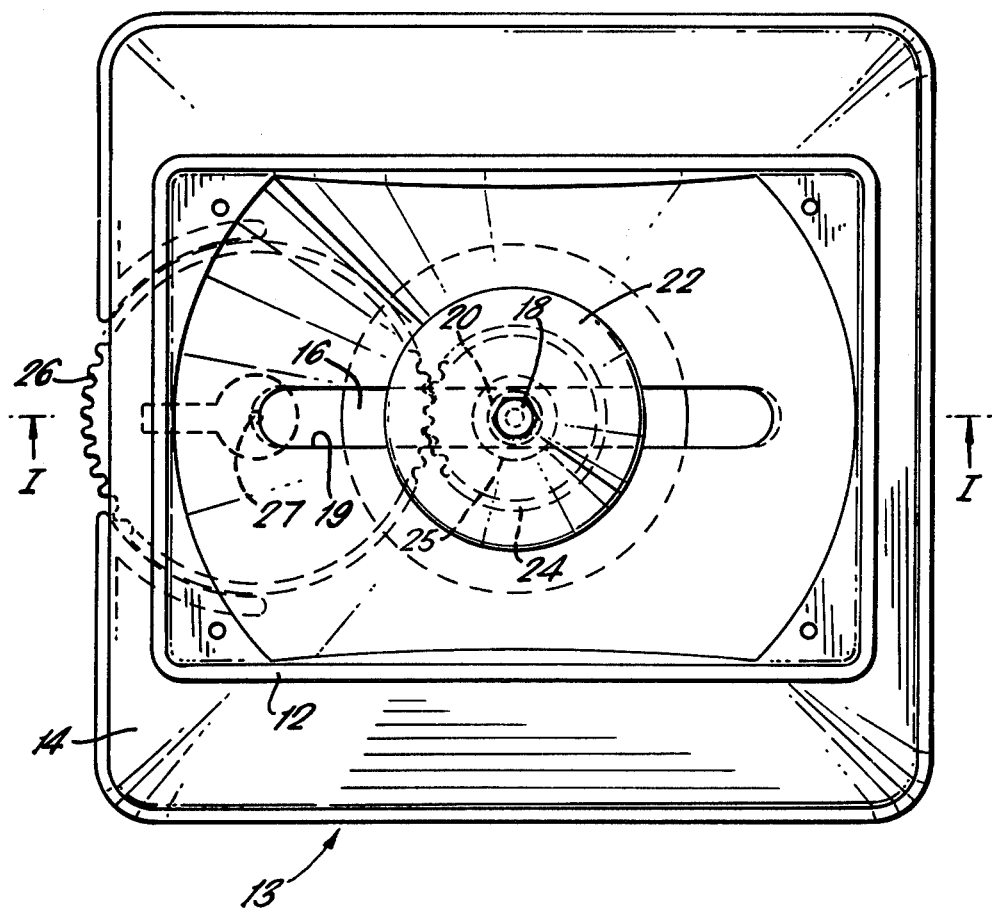
FIG. 2 is a plan view of the mounting of FIG. 1.

Referring to FIGS. 1 and 2, a visual display unit monitor 10 has a screen 11. The monitor is screwed to the movable upper part 12 of a swivel mounting 13. The stationary lower part 14 of the mounting is intended to stand on a horizontal surface, for example, a desk top.

The two parts of the mounting have mating spherical surfaces 15, 16 which allow the upper part 12 to be rotated on the lower part 14 about the axis of an interconnecting nut 17 and bolt 18. In this embodiment rotation of the upper part 12 about a horizontal axis is restricted by a diametral slot 19 in the upper part 12 which is engaged by a sleeve 20 which surrounds the bolt 18. The monitor 10 attached to the upper part 12 may thus be turned so that its screen 11 faces in a different direction, i.e. to one side of the straight ahead position shown in FIG. 1, or the monitor may be tipped up or down so that the screen may be more readily viewed by the user, at an angle, for example ±20°, to the horizontal.

To fix the screen of the monitor 10 in its selected position clamping means 21 are provided. The clamping means incorporate the above-mentioned nut 17 and bolt 18 and the sleeve 20 which forms the stem of a domed clamping element 22 in which the head of the bolt 18 is held captive. The end 23 of the stem is of square cross-section and engages a socket of corresponding section in the lower part 14 so that both the clamping element 22 and the bolt 18 cannot rotate. The nut 17 is held captive in a second clamping element 24 spaced from the lower part 14 of the mounting by a washer 25. This second clamping element 24 is conveniently a gear wheel so that it may be rotated by a further gear wheel 26 which is attached to the lower part 14 of the mounting by a spindle 27 having a threaded end 28 and which projects forwardly of the lower part. Manual rotation of the gear wheel 26 thus rotates the clamping element 24 and tightens the nut 17. The domed clamping element 22 is thereby drawn downwardly and acts to restrict or prevent relative sliding movement between the spherical surfaces 15, 16 depending on the degree of tightening applied.

The relative dimensions of the mounting 13 and the monitor 10 and the angle to which the monitor may be tipped will determine whether the monitor may be simply rested on the mounting instead of being rigidly attached to the upper part 12 by screws.

The material from which the mounting 13 is formed will also depend on the weight of the monitor 10 and its size relative to the mounting, but any suitable material may be used providing that it allows (with the assistance of friction reducing means as described below, if desired) the relative sliding movement between the spherical surfaces 15, 16 of the upper and lower parts of the mounting when the monitor rests or is fixed thereon. Conveniently the upper and lower parts of the mounting may be injection moulded of structural foamed polystyrene or noryl. The domed clamping element 22 and the gear wheels 24, 26 may be similarly formed.

Instead of the gear wheel 26 having teeth around its whole periphery, it may have a plain, contoured or roughened front portion which is contacted by the user to clamp or loosen the mounting and a toothed rear portion for meshing with the teeth of gear wheel 24.

FIG. 3 shows a modified swivel mounting which is similar to the mounting shown in FIGS. 1 and 2 in that the upper part 12 remains unchanged, but the lower part 30 is substantially an upstanding tubular column or post 31 which is splayed at its top end to provide the respective spherical surface 16. The post is intended to be fixed at its lower end in any desired manner or be provided with suitable feet (not shown). Alternatively, the lower end of the post may be formed integrally with or fixed to an extended foot or stand which allows the mounting and a monitor thereon to be free standing.

The post 31 may carry a cable 32 passing axially through the mounting to the monitor to be rested or fixed thereon. For this purpose the clamping bolt 33 also has an axial passageway 34. If desired, the cable 32 may enter the post 31 through a hole (not shown) in the post wall rather than at its lower end.

The smaller diameter of the post 31 compared with the lower part 14 of the mounting 13 of the embodiment of FIGS. 1 and 2, further allows the clamping means to employ a single gear wheel 24 which is made accessible through an aligned opening in the post.

In both the embodiments of FIGS. 1 to 3 the spherical surfaces 15, 16 are illustrated making direct sliding contact. FIGS. 4 to 6 illustrate three alternative embodiments in which the surface 15 of the upper part 12 is spaced from the surface 16 of the lower part 14 or 31 by friction reducing means which may be desired to assist relative movement between the upper part and the respective lower part.

FIG. 4 shows an annular pad 40 of nylon or polyethylene which protrudes a small amount from a recess in the surface 16 of the lower part.

FIG. 5 shows two rings 41 of nylon or polyethylene similarly mounted in respective grooves in the surface 16 of the lower part.

FIG. 6 shows the surface 16 of the lower part of the mounting in plan view to illustrate the use of four local ball bearing units 42. Alternatively, each bearing unit could be replaced by a pad of nylon or polyethylene.

In still further embodiments friction reducing means is employed comprising tape or a sprayed-on coating of polytetrafluoroethylene.

Examples of suitable materials for the above described friction reducing means are those mentioned. However, other materials may be used providing they are compatible with the mating surface 15 of the upper part 12 of the mounting.

The use of a particular friction reducing means may be an advantage if it is desired to use another material, e.g. aluminium, for the upper and lower parts of the mounting.

In each case, the friction reducing means may be provided on or in the surface 15 of the upper part of the mounting for relative sliding movement with the surface 16 of the lower part, instead of on or in the surface 16.

Figure 7:
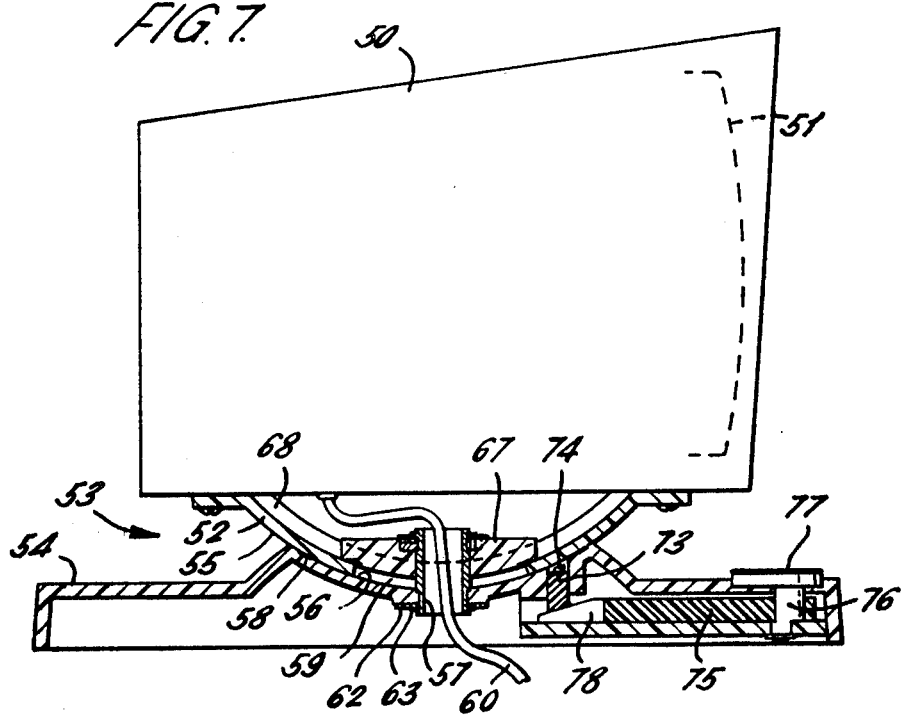
FIG. 7 is a side elevation of a visual display unit monitor attached to a further swivel mounting, the mounting being shown in section along line 7—7 in FIG. 8.
Figure 8:
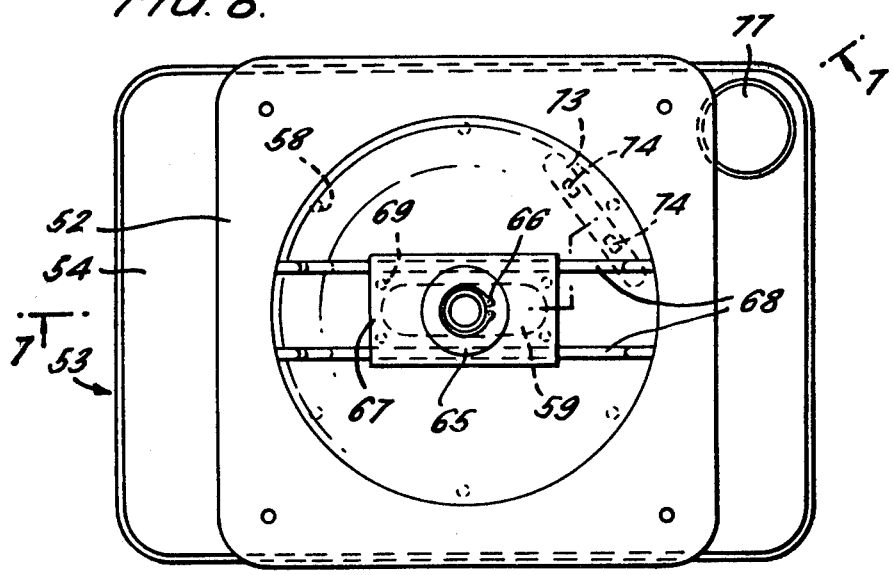
FIG. 8 is a plan view of the mounting of FIG. 7.

FIGS. 7 to 9 concern a further embodiment of a visual display unit monitor 50 having a screen 51, the monitor again being screwed to the movable upper part 52 of a swivel mounting 53 and the stationary lower part 54 of the mounting being intended to stand on a horizontal surface, for example, a desk top.

The two parts of the mounting have mating spherical surfaces 55, 56 which allow the upper part 52 to be rotated on the lower part 54 about the axis of an interconnecting vertical shaft 57. Discs 58 of polytetrafluoroethylene are positioned between the surfaces to assist relative sliding movement. Rotation of the upper part 52 about a horizontal axis is restricted by a diametral slot 59 in the upper part 52 through which the shaft 57 passes.

Also, in a manner similar to the embodiment of FIG. 3, the shaft 57 is hollow to allow the power cable 60 of the monitor 10 to pass therethrough. However, in this embodiment, stop means 61 are provided to limit the allowed angle of movement of the upper part about the axis of the shaft 57 and thereby preclude twisting of the cable 60.

The lower end of the shaft 57 has diametrically opposed milled flats and passes through an aperture in the lower part 54 of corresponding cross-section, whereby relative rotation of the shaft and the lower part is precluded. The shaft is held in position by a washer 62 and circlip 63. The top end of the shaft 57 likewise has milled flats for reception in a ring 64 having an aperture of corresponding cross-section, and is held by a washer 65 and a circlip 66 both of which are omitted in FIG. 9 for the purposes of clarity. The shaft 57 also extends through a moulded piece 67 which sits within the dish shaped upper part 52 and is locked against movement relative to the upper part about the axis of the shaft by two upstanding ribs 68 on the upper part engaging in slots or, in this embodiment, rebates in the underside of the moulding 67. Further discs 69 of polytetrafluoroethylene assist relative movement between the upper part 52 and the moulding 67 during tilting of the upper part about a horizontal axis.

The moulding 67 also serves as a housing for the ring 64, which remains stationary during movement of the moulding about the axis of the shaft 57, and the above-mentioned stop means 61. These stop means (FIG. 9) comprise projections 70, 71 on the ring 64 and the moulding 67 respectively and, in this embodiment, loose segments 72 which limit still further the angle of movement of the moulding and hence the upper part 52 about the axis of the shaft 57. Conveniently, the segments 72 may be provided as a ring or arcuate member which the user may cut as required. In this embodiment, the upper part 52 is capable of swivelling through 90° in either direction from its straight ahead position. The limit of movement of the upper part 52 about a horizontal axis is determined by the length of the slot 59.

Separate clamping means are again provided to hold the upper part 52 and hence the monitor 50 in the position into which it has been moved by the user. In this particular embodiment an upstanding plate 73 mounted for vertical sliding movement in a slot in the lower part 54 and having two soft rubber feet 74, or an equivalent strip, on its upper face for making frictional engagement with the undersurface of the upper part 52. Upward movement of the plate 73 is effected by a lever 75 guided for reciprocal movement by an eccentric spindle 76 of a knob 77, the spindle engaging a slot in the lever and the free end of the lever having two fingers 78 each of which acts as a wedge beneath the plate 73. Withdrawal of the fingers 78 of the arm 75 relatively to the plate 73 allows the plate to move downwardly to release its clamping effect on the upper part 52.

FIGS. 10 and 11 relate to a swivel mounting which is generally the same as the mounting of FIGS. 7 to 9 except that it has a different clamping arrangement. In this embodiment, a vertically movable plate 80 having a strip 81 of soft rubber projecting from its upper surface is urged upwardly by springs 82 and is movable downwardly by the fingers 83 of a reciprocally movable slotted lever 84. The fingers 83 project downwardly at a small angle relatively to the longitudinal axis of the lever and engage in respective apertures in the plate 80. Inward movement of the lever 84 into the position shown allows the springs 82 to raise the plate 80 into its operative position and the lever is held inserted by a catch arrangement 85 comprising interengaging lugs on the lever and the lower part 54 and a spring 86. Outward movement of the lever 84 to release the plate 80 and hence the upper part 52 is effected by a further spring 87 when the lever is depressed to release the catch 85. The downward angle of the fingers 83 and the strength of the spring 87 are selected so that the spring 87 is able to overcome the springs 82 which act on the plate 80.

The stop means 61 are advantageous to prevent the power cable 60 being twisted. They may also be adapted to provide other desired limits on the swivelling movement of the upper part 52. In a particular embodiment if 180° swivelling movement in one direction from the straight ahead position is required, the ring 34 may be set initially so that the projection 70 rests against one of the segments 72.

Figure 12:
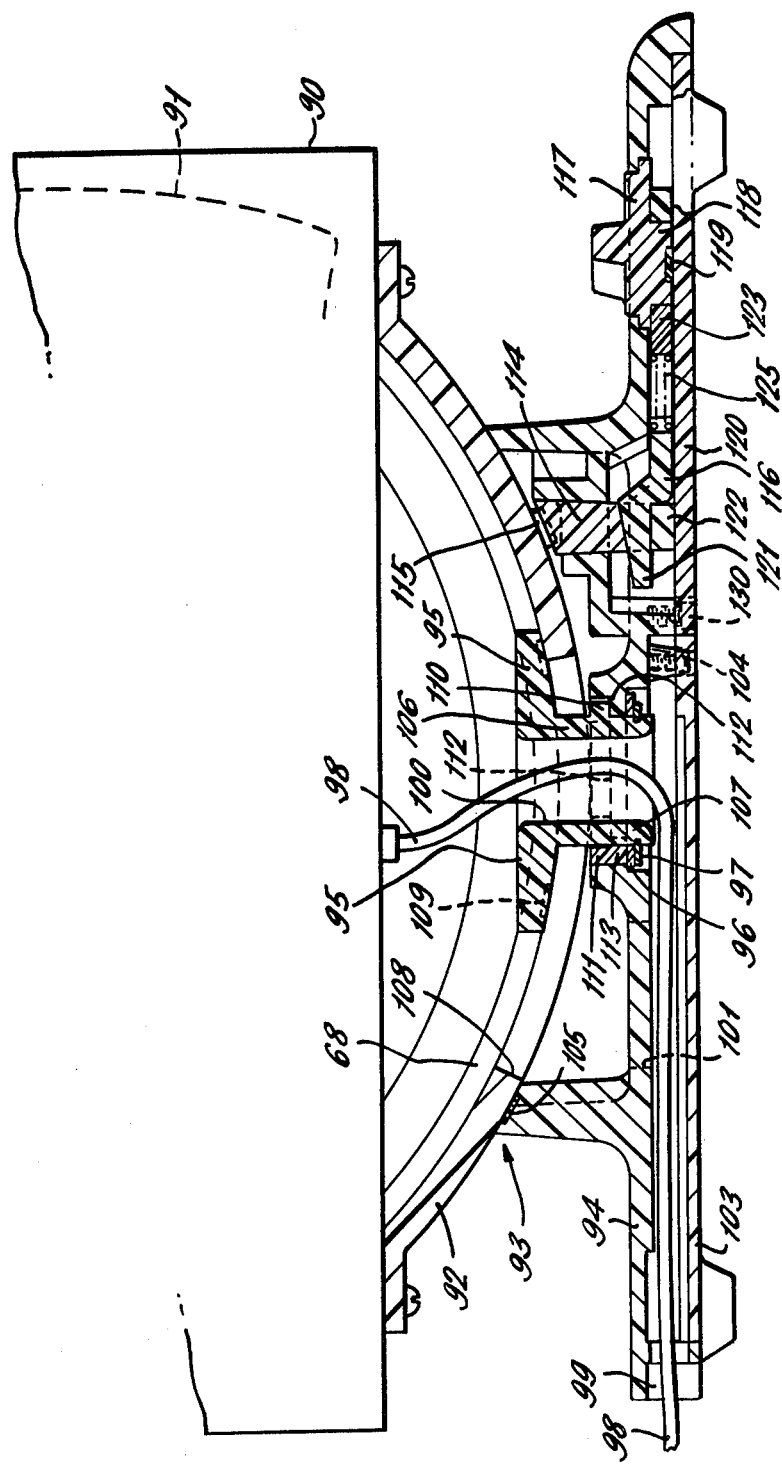
FIG. 12 is again a similar sectional view to FIG. 7 of a further swivel mounting along line 12—12 in FIG. 13.
Figure 13:
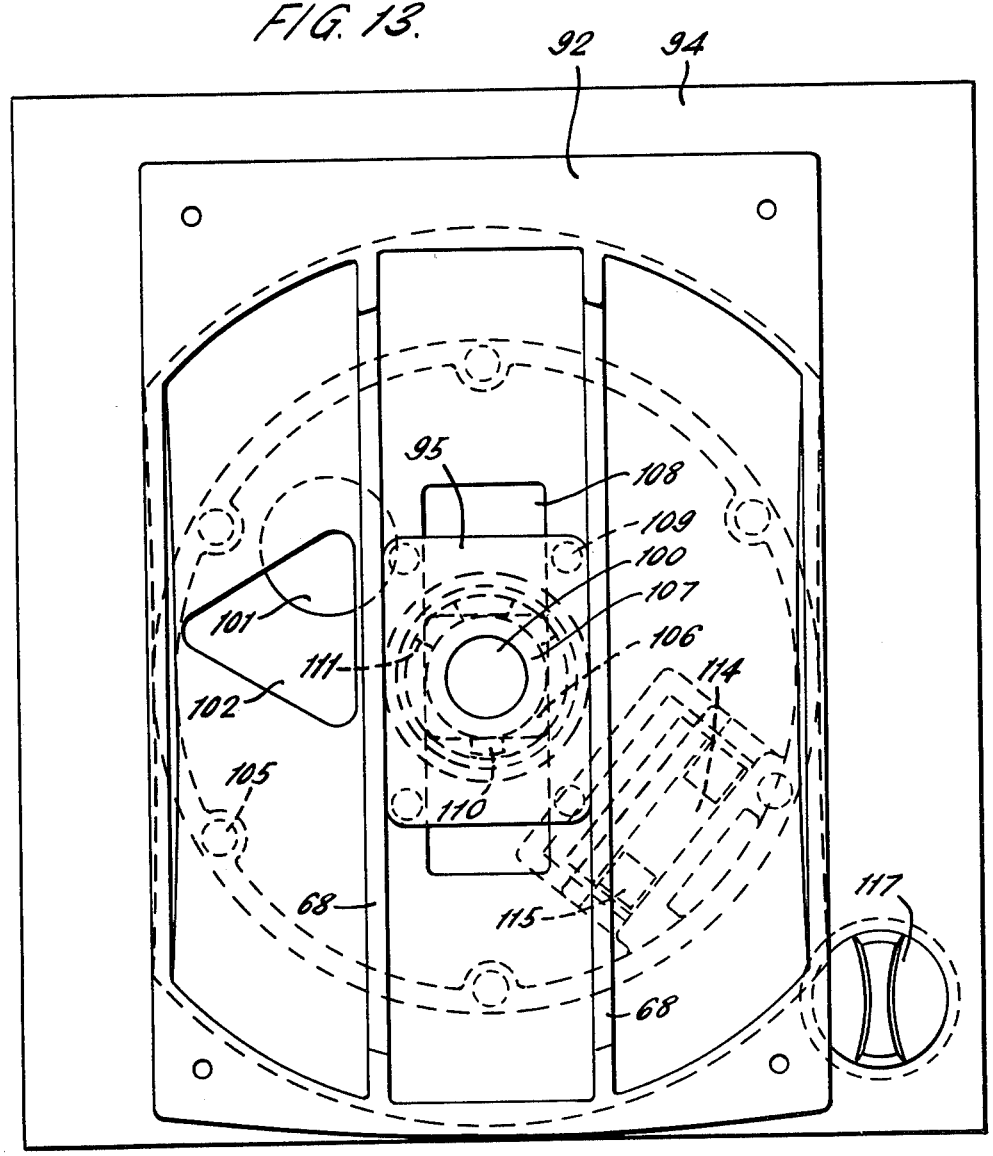
FIG. 13 is a plan view of the mounting of FIG. 12.
Figure 14:
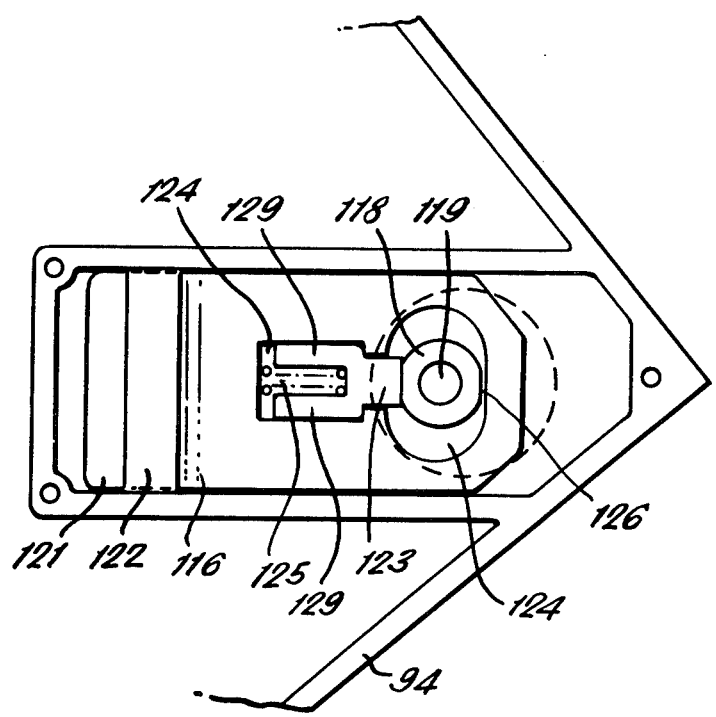
FIG. 14 is an underview of part of the clamping means of the mounting of FIG. 12, the respective cover portion being omitted.

A still further embodiment of swivel mounting is illustrated in FIGS. 12 to 14. This mounting is closest to the previously described mounting illustrated in FIGS. 7 to 9 and will be compared therewith. As in that case, a visual display unit monitor 90 having a screen 91 is screwed to the movable upper part 92 of a swivel mounting 93 and the stationary lower part 94 of the mounting is intended to stand on a horizontal surface, for example, a desk top. However, in this embodiment, the two parts 92, 94 are interconnected by one member 95 injection moulded of structural foamed polystyrene or noryl which replaces both the moulding 67 and the shaft 57. Moreover, the member 95 sits between the ribs 68 in the upper part 92 instead of over them. The member is held in its assembled position by a washer 96 and circlip 97.

The power cable 98 of the monitor passes through an aperture 99 in the peripheral wall of the lower part 94 and then either through an axial passageway 100 in the member 95 (as shown) or first through an opening 101 in the lower part 94 and then an opening 102 in the upper part 92. A local cover plate 103 is attached to the underside of the lower part 94 by screws 104 (only one being shown).

Swivelling movement of the upper part 92 and thus the monitor relative to the lower part about the vertical axis of the member 95 is assisted by the provision of polytetrafluoroethylene pads 105 in recesses in the spherical sliding surface of the lower part.

Tilting movement of the upper part 92 is again limited to one direction by engagement of the boss 106 on the shaft 107 of the member 95 in a slot 108 in the upper part 92 extending between and parallel to the ribs. To reduce wear on the sides of the slot 108, the boss 106 on the shaft 107 of the member 95 has a generally square cross-section to provide surface to surface engagement. This configuration also requires the slot 108 to have substantially square ends instead of semicircular ends. Friction reducing pads 109 are provided in recesses in the underside of the head of the member 95.

To limit the allowed swivelling movement of the upper part 92, the stop means provided in this embodiment are a lug 110 integrally moulded on the shaft 107 of the member 95 and a partial ring member 11 both of which are located in a recess 112 surrounding the bore in the lower part provided for reception of the shaft 107. The partial ring member 111 has a downwardly extending projection 113 which is pressed into a depression in the base of the recess to fix the member relative to the lower part of the mounting. Each end of the partial ring member 111 thereby provides a stop for engagement by the lug 110.

The clamping means again comprise a vertically mounted plate 114 carrying rubber feet 115 and actuated by a knob operated lever 116. The knob 117 is assembled in its aperture in the lower part 94 of the mounting from underneath. An eccentric spindle 118 on the knob engages a slot 124 in the lever 116 which is retained within the lower part 94 by a cover portion 120 attached by screws 130. A friction reducing pad 119 is disposed between the eccentric spindle 118 on the knob and the cover portion 120. Rotation of the knob 117 effects longitudinal movement of the lever 116. In this embodiment the end 121 of the lever 116 which engages the plate 114 is goose-necked, which allows the overall height of the mounting to be reduced, and more importantly lies over a fixed portion 122 of the lower part 94 of the mounting, whereby downward pressure from the plate 114 on the lever 116 is not transmitted to the cover portion 120. Forward movement of the lever 116 which effects upward movement of the plate 114 to lock the mounting is achieved via an intermediate member 123 located with the knob spindle 118 in the slot 124 in the lever and having spaced legs 129 which provide a socket for a spring 125 acting between the lever 116 and the member 123 to urge the member into contact with the spindle 118. The spring 125 thereby prevents the lever 116 applying overpressure on the plate 114 which might otherwise lift the upper part 92 of the mounting relative to the lower part. The eccentric portion 118 of the knob 117 is also provided with diametrically opposed flats 126 which act like detents to give a "feel" to the user as to when the mounting is locked and released.

The invention is not restricted to the specific details of the embodiments described above. For example, the swivel mounting may be used with other instruments or apparatus instead of a visual display unit monitor, e.g. a television set, a radio, or a speaker.

Also, the provision of the guide slot 19 may be omitted if it is not desired to limit the movement of the upper part of the mounting to rotation about a single horizontal axis. Similarly in some cases it may be possible to omit the clamping means.

Furthermore, the swivel mounting may be employed in a different location from that envisaged in the specific embodiments. For example, the mounting may be disposed upside down above an instrument or apparatus to be suspended therefrom, or on its side for attachment to a vertical surface. It will thus be appreciated that the particular shape of the stationary part of the mounting is changed as desired.

It is envisaged above that the swivel mounting is a separate unit from the instrument or apparatus to be used therewith. Instead, the upper part of the mounting may be incorporated into or form part of the housing of the instrument or apparatus. For example, the spherical surface 15 could be a corresponding convex surface in the base of a visual display unit monitor.

I claim:

1. A swivel mounting for an instrument or apparatus comprising two interconnected parts, one part, in use, being associated with an instrument or apparatus, and the other part being intended to remain stationary relative to a fixed surface, if necessary by fixing, the two parts having mating spherical surfaces which are capable of relative sliding movement to enable the instrument or apparatus and said one part to be rotated selectively about a vertical axis and a horizantal axis, relative to said other part, means interconnecting the two parts, separate clamping means for applying or increasing frictional pressure between the parts to lock the spherical surfaces against relative sliding movement, said clamping means having a wedge action, said wedge action being effected by a lever guided for longitudinal movement and actuated by the rotary action of a control knob.

2. A swivel mounting as claimed in claim 1, including guide means between the two parts which restrict the relative sliding movement between the spherical surfaces so that the instrument or apparatus and said one part can be rotated about only one horizontal axis.

3. A swivel mounting as claimed in claim 1, wherein the two parts are interconnected by a clamping device which may be tightened to lock the spherical surfaces against relative sliding movement.

4. A swivel mounting as claimed in claim 1, including stop means between the two parts which limit the relative movement of the spherical surfaces about a vertical axis.

5. A swivel mounting as claimed in claim 1, including friction reducing means between the spherical surfaces to assist the relative sliding movement.

6. A swivel mounting as claimed in claim 1, having means interconnecting the two parts, an axial passageway in said interconnecting means for receiving a power cable for the instrument or apparatus.

7. A swivel mounting for an instrument or apparatus comprising two interconnected parts, one part, in use, being associated with an instrument or apparatus, and the other part being intended to remain stationary relative to a fixed surface, the two parts having mating surfaces which are capable of relative sliding movement to enable the instrument or apparatus and said one part to be rotated selectively about a vertical axis and a horizontal axis relative to said other part, clamping means for applying frictional pressure between the two parts to lock the surfaces against relative sliding movement, actuator means for operating said clamping means, said actuator means being coupled to said clamping means and including a manually operable member, said manually operable member being supported for rotary motion about an axis which is eccentric to and laterally spaced from said vertical axis of said swivel mounting, and means for coupling said manually operable member to said clamping means, said manually operable member being exposed and accessible when an instrument or apparatus is on the swivel mounting and the swivel mounting is in a normal position of use on a fixed surface, whereby the clamping means may be actuated by an operator in the course of normal use of the instrument or apparatus to lock and unlock the surfaces against relative sliding movement.

8. A swivel mounting for an instrument or apparatus comprising two interconnected parts, one part in use being associated with an instrument or apparatus, and the other part being intended to remain stationary relative to a fixed surface, the two parts having mating surfaces which are capable of relative sliding movement to enable the instrument or apparatus and said one part to be rotated selectively about a vertical axis and a horizontal axis relative to said other part, clamping means for applying frictional pressure between the two parts to lock the surfaces against relative sliding movement, said clamping means including a clamping member and an actuator means for operating said clamping member, said clamping means being located on one of said parts and being movable to and from a position where it frictionally contacts the other said part, said actuator means including a reciprocating member which is supported for reciprocating motion, said reciprocating member being provided with a wedge portion which engages said clamping member and is operable to move the clamping member in response to movement of said reciprocating member.

9. A swivel mounting according to claim 8 wherein the reciprocating member includes two portions which are connected together with a compression spring, said compression spring being operable to prevent the reciprocating member from applying excessive pressure on the clamping member.

10. A swivel mounting according to claim 8 wherein said actuator means includes a manually operable member which is supported for rotary motion about an axis which is eccentric to and laterally spaced from said vertical axis of said swivel mounting, and means connecting said manually operable member to said reciprocating member to produce reciprocating movement of said reciprocating member in response to rotary movement of said manually operable member.

11. A swivel mounting for an instrument or apparatus comprising two interconnected parts, one part in use being associated with an instrument or apparatus, and the other part being intended to remain stationary relative to a fixed surface, the two parts having mating surfaces which are capable of relative sliding movement to enable the instrument or apparatus and said one part to be rotated selectively about a vertical axis and a horizontal axis relative to said other part, clamping means for applying frictional pressure between the two parts to lock the surfaces against relative sliding movement, said clamping means including a clamping member and an actuator means for operating said clamping member, said clamping means being located on one of said parts and being movable to and from a position where it frictionally contacts the other said part, said clamping member being located eccentrically with respect to said vertical axis so that, upon operation of said actuator means, said clamping member will frictionally contact said other part at a location which is spaced from the vertical axis of rotation of said other part, thereby restraining rotational movement of the other part about said vertical axis.

* * * * *